Oct. 18, 1927.
M. L. NORRIS
1,646,211
DYNAMO ELECTRIC MACHINE
Filed April 5, 1926
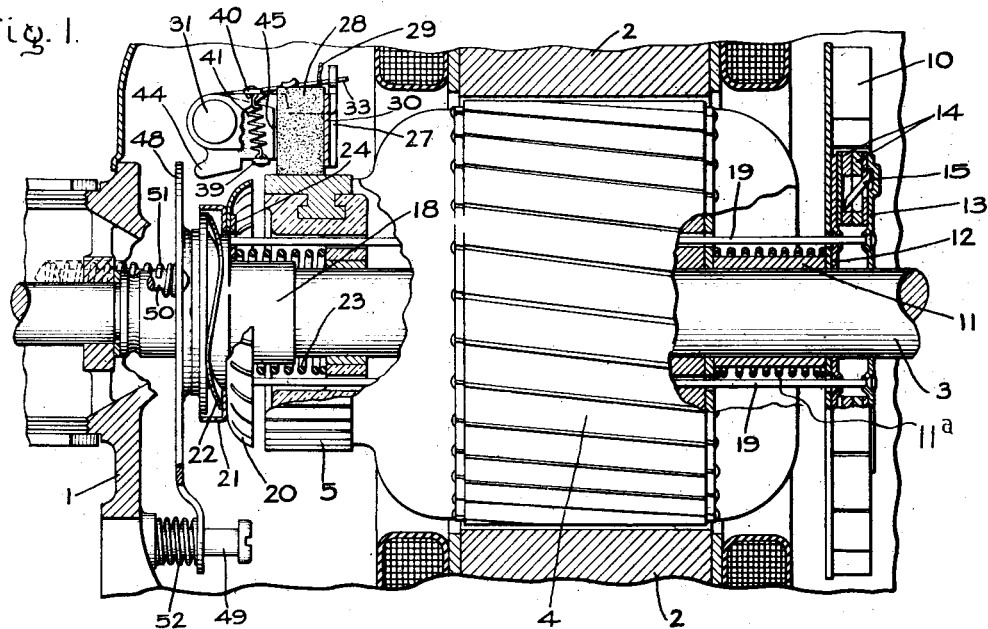
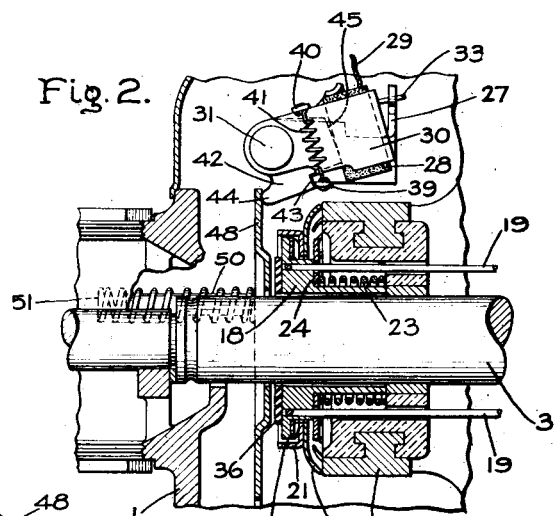
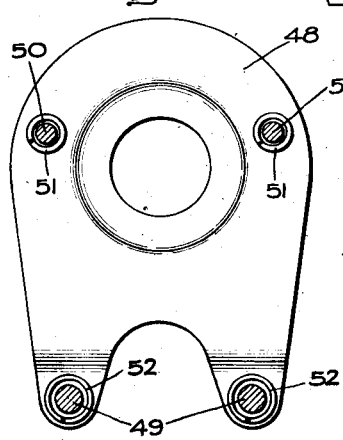
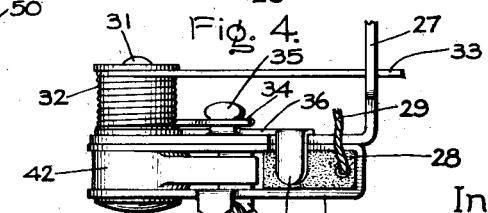
Inventor
Marvin L. Norris
by
His Attorney.

Patented Oct. 18, 1927.

1,646,211

UNITED STATES PATENT OFFICE.

MARVIN L. NORRIS, OF FORT WAYNE, INDIANA, ASSIGNOR TO GENERAL ELECTRIC COMPANY, A CORPORATION OF NEW YORK.

DYNAMO-ELECTRIC MACHINE.

Application filed April 5, 1926. Serial No. 99,805.

My invention relates to dynamo-electric machines and particularly to alternating current, single phase, commutator type machines which start as repulsion machines and run as induction machines, and an object of my invention is the provision of improved means for short circuiting the commutator and raising the brushes whereby the change from repulsion to induction operation is effected. A further object of my invention is the provision of speed responsive means for short circuiting the commutator and raising the brushes such that after the machine has acquired a speed sufficient to short circuit the commutator and raise the brushes the rotating element is relieved of frictional engagement with other parts, except the bearings.

My invention will be better understood from the following description taken in connection with the accompanying drawing, and its scope will be pointed out in the appended claims.

Referring to the drawing, Fig. 1 is a partial longitudinal sectional view of a motor involving my invention; Fig. 2 shows a part of Fig. 1 with the commutator short circuited and the brushes raised; Fig. 3 shows a detail of the brush raising mechanism; and Fig. 4 is a top view of the brush holder drawn to a larger scale.

In the drawing the motor frame 1 supports the field poles 2 and suitable bearings for the rotor shaft 3. Mounted on the shaft 3 is the armature 4 carrying a winding having terminals brought out to the commutator 5.

At the end of the rotor opposite to the commutator is shown a ventilating fan 10 and between the fan and the armature 4 is a sleeve 11. Beyond the fan 10, I employ a centrifugal device like that disclosed in the copending application of Newton T. Kelso, 736,441, filed Sept. 8, 1924 and assigned to the same assignee as the present application. This device comprises an abutment plate 12, an operated plate 13 and intermediate weight members 14 which have a limited outward movement. The weight members 14 have openings therein in which lie small members 15 having wedge-shaped ends and so arranged that when the weights move outwardly the members 15 are turned from the diagonal position illustrated to a position more nearly parallel with the shaft and in so doing move the plate 13 axially away from the armature. Because of the changing angle of these members 15 as they are moved by the weights, movement of the plate 13 takes place with a snap action when once begun.

Slidably mounted on the shaft and partially within the commutator is the sleeve 18 which is connected with the plate 13 by means of rods 19 extending through the armature. The commutator short circuiting disk 20 having the back plate 21 is mounted on the sleeve 18 and arranged between the back plate 21 and the end flange of the sleeve is the spring washer 22. The coil spring 23 surrounding a part of the sleeve 18 and engaging the commutator at one end and the washer 24 at the other end serves to resiliently maintain the short circuiting disk 20 away from the commutator and the plate 13 of the centrifugal device in its released position when the rotor is at rest.

Various constructions of brush holders are in use which permit the manual raising of the brushes from the face of the commutator. Inasmuch as the brushes are usually slidably mounted in the holders and spring pressed against the commutator it is necessary to move the holders through a considerable distance to insure the raising of the brushes from the commutator. Where the brushes are to be raised automatically in response to a predetermined rotor speed as in the present case and where the commutator short circuiting member need have only a small movement it is desirable to be able to raise the brushes by a correspondingly small movement of their holders. By the brush holder arrangement which I have devised and which I shall now describe the small motion available from the centrifugal device is ample to completely raise the brushes from the commutator.

Secured to a stationary part of the motor is the bracket 27 which carries the brushes 28, one only of which is shown, connected by the shunt 29 and arranged to short circuit a definite portion of the armature winding which is in proper relation with respect to the stator winding. Each brush 28 is slidably mounted in a brush holder 30 which is pivoted on the stud 31 carried by the bracket 27. Coil spring 32 mounted on the stud 31 has one end 33 hooked under a portion of the bracket 27 and the other end 34 engaging a lug 35 on an arm 36 loosely mounted on the stud 31. This arm has the projection 37 which engages the brush and presses it against the commutator with the desired pressure. The bracket 27 is provided with a lug 39 which is connected to a similar lug 40 on the brush holder 30 by a light coil spring 41, the spring 41 serving to return the brush holder to the position shown in Fig. 1 when the brush raising member is withdrawn. The lug 39 also forms a stop for the return movement of the brush holder 30. Between the two sides of the brush holder 30 and pivoted on the stud 31 is the dog 42 which has a shoulder 43 adapted to engage the lug 39 when the brush is raised and a nose 44 which is engaged by the operating plate to be described later. Dog 42 has a cam face 45 which when the parts are in the position shown in Fig. 1 lies parallel and slightly spaced from the adjacent side of the brush. When the dog is rocked in the brush raising movement, the cam face first engages the brush with a wedging action and then carries the brush and holder with it to the position shown in Fig. 2, this movement being limited by the stop lug 39.

With this mechanism the brush holder need be rocked through only a small angle to raise the brush from the commutator for the brush cannot slide down through the holder in the raising movement since it is wedged between the holder and the cam face of the dog.

For raising the brushes in response to movement of the centrifugal device, I have provided the plate 48 whose lower ends are supported on the screws 49 engaging the frame and at whose upper portion are secured pins 50 surrounded by coil springs 51 partly sunk in openings in the frame. On the screws 49 between the plate 48 and the frame 1 are light springs 52. The upper part of the plate is adapted to engage the nose 44 on each brush holder to rock the same on its pivot thereby raising the brush from the commutator. The combined strength of the springs 51 is of course greater than the combined strength of the springs 41 and 32 but less than the spring 23.

When the rotor is at rest the sleeve 18 together with the short circuiting disk 20 is pushed to the left out of contact with the commutator as shown in Fig. 1, the washer 36 on the end of the sleeve 18 engaging the plate 48. In this position the brushes rest on the commutator and the machine is in condition to operate as a repulsion motor. Upon reaching a predetermined speed, the centrifugal device operates to pull the sleeve 18 to the right against the spring 23 until it is stopped by engagement with the base of the commutator as shown in Fig. 2. In this position the spring washer 22 is compressed thereby resiliently pressing the short circuiting disk against the ends of the commutator bars. The plate 48 has followed the sleeve 18 in this movement under the influence of the springs 50 and has engaged the dog 42 and raised the brushes 28, but not until after the short circuiting disk has engaged the commutator to short circuit it. The parts are so proportioned that the plate 48 reaches its limiting position slightly before the sleeve 18 reaches its limiting position whereby a small space is left between the plate and the washer 36 so that during the normal running of the machine the rotor is free of all frictional contact with the stationary parts of the machine except the bearings. Upon coming to rest, the centrifugal device permits the spring 23 to return the short circuiting disk to inoperative position and the plate 48 to the position where the brushes may engage the commutator.

With a construction of centrifugal device and an arrangement such as shown an accidental movement of the plate 48 or sleeve 18 to the right by hand may permit the small members 15 of the centrifugal device to get out of place. To prevent this I have provided a comparatively weak coil spring 11ª around the sleeve 11 which will cause the abutment plate 12 to follow the plate 13 whenever the latter is moved to the right except of course when it is moved by the weights.

What I claim as new and desire to secure by Letters Patent of the United States is:—

1. In an alternating current motor, the combination of a frame, a rotor mounted therein having a commutator, brushes therefor, a brush raising member mounted on the frame, means for moving the member axially, means for limiting the extent of its movement, and speed responsive means for controlling the movement of the member, said speed responsive means being constructed to move beyond the limit of movement of the brush raising member.

2. In an alternating current motor, the combination of a frame, a rotor mounted therein having a commutator, brushes therefor, a brush raising plate mounted on the frame for movement in an axial direction, springs for moving the plate, means for limiting its movement, speed responsive means for short circuiting the commutator and for controlling the movement of the brush raising plate, said speed responsive means being moved to a position at a predetermined speed of the rotor out of frictional contact with the brush raising plate.

3. In an alternating current motor, the combination of a rotor, a movable brush holder, a brush therein, means for moving the brush relative to the holder toward the rotor, speed responsive means carried by the rotor for raising the brush holder from the rotor, and automatic means for rendering said brush moving means inoperative when the brush holder is raised.

4. In an alternating current motor, the combination of a rotor, a movable brush holder, a brush therein, means for causing the brush to feed through the holder, a speed responsive device carried by the rotor, and means actuated by said device for raising the brush holder from the rotor, said means comprising a member arranged to clamp the brush to the holder before the holder is raised.

5. In a dynamo-electric machine, the combination of a rotor, a movable brush holder, a brush carried thereby, resilient means for causing the brush to feed through the holder toward the rotor, and an operating member movable initially to fix the brush relative to the holder and subsequently to raise the holder and the brush from the rotor.

6. In a dynamo-electric machine, the combination of a rotor, a brush holder support, a brush holder pivoted thereto, a brush carried by the holder, a spring for moving the brush through the holder toward the rotor, and a brush raising member pivoted to said support and having a cam face for engaging the brush whereby when said member is rocked the brush is first clamped to the brush holder and the brush and holder are then raised from the rotor.

7. In an alternating current motor, the combination of a rotor shaft, centrifugal weights carried thereby, an abutment member, an actuated member, means in engagement with said members and arranged to be operated by the weights for moving the actuated member, and means for causing the abutment member to follow the actuated member whenever the latter is moved by other than the weight operated means.

In witness whereof I have hereunto set my hand this 1st day of April, 1926.

MARVIN L. NORRIS.